United States Patent [19]
Bellows

[11] Patent Number: 5,937,033
[45] Date of Patent: Aug. 10, 1999

[54] TELEPHONE SYSTEM DIAGNOSTIC MEASUREMENT SYSTEM INCLUDING A DISTANT TERMINAL DROP TEST MEASUREMENT CIRCUIT

[75] Inventor: Alfred H. Bellows, Wayland, Mass.

[73] Assignee: GTE Laboratories Incorporated, Waltham, Mass.

[21] Appl. No.: 08/859,409

[22] Filed: May 20, 1997

[51] Int. Cl.[6] .............................. H04M 1/24; H04M 3/08; H04M 3/22
[52] U.S. Cl. ............................... 379/27; 379/24; 379/29; 379/26; 379/30; 324/522; 324/525
[58] Field of Search ................... 379/22, 24, 26, 379/27, 32, 29, 1, 2, 5–6, 12, 23, 25, 30; 324/509, 519, 522, 525, 527; 370/247

[56] References Cited

U.S. PATENT DOCUMENTS

| | | | |
|---|---|---|---|
| 4,270,030 | 5/1981 | Brolin et al. | 379/27 |
| 4,306,313 | 12/1981 | Baldwin | 455/601 |
| 4,852,145 | 7/1989 | Bevers et al. | 379/27 |
| 4,943,993 | 7/1990 | Fore | 379/6 |
| 5,054,050 | 10/1991 | Burke et al. | 379/27 |
| 5,073,919 | 12/1991 | Hagensick | 379/29 |
| 5,111,497 | 5/1992 | Bliven et al. | 379/27 |
| 5,115,462 | 5/1992 | Kennedy et al. | 379/29 |
| 5,121,402 | 6/1992 | Marr et al. | 379/26 |
| 5,301,050 | 4/1994 | Czerwiec et al. | 395/110 |
| 5,355,405 | 10/1994 | Bernstein | 379/25 |
| 5,361,293 | 11/1994 | Czerwiec | 379/27 |
| 5,402,073 | 3/1995 | Ross | 324/539 |
| 5,699,402 | 12/1997 | Bauer et al. | 379/26 |

OTHER PUBLICATIONS

Bellcore; Technical Reference TR–NWT–000909; Generic Rquirem,ent and Objectives for Fiber in the Loop Systems; Issue 1, Dec. 1991.

*Primary Examiner*—Curtis A. Kuntz
*Assistant Examiner*—Rexford N Barnie
*Attorney, Agent, or Firm*—Leonard Charles Suchyta; Floyd E. Anderson

[57] ABSTRACT

In a telephone system wherein a number of distant terminals are each connected to a remote terminal and in which a number of remote terminals are each connected to a central office, a distant terminal includes a drop testing circuit for making sequential measurements on a plurality of customer telephones. The drop test circuit is included in a measurement system for providing condition responsive signals describing parameters of the telephone system, The drop test circuit includes circuitry such as scaling resistors, voltage sources, switching elements, and a multiplexed analog to digital voltage-sensing converter for providing digital data for transmission to the remote terminal or other more central location. The remote terminal comprises a computer based analyzer for interpreting, processing, and storing the data transmitted to it. The analyzer, servicing hundreds or thousands of telephones, may accumulate historical data and sophisticated measurements as well as pass-fail data indicating whether the drops to each customer meet conventional standards. The analyzer is further capable of providing all results to conventional drop test survey equipment or to service personnel in a variety of formats.

12 Claims, 4 Drawing Sheets

5,937,033

TELEPHONE SYSTEM DIAGNOSTIC MEASUREMENT SYSTEM INCLUDING A DISTANT TERMINAL DROP TEST MEASUREMENT CIRCUIT

FIELD OF THE INVENTION

The present invention relates to testing of copper telephone line drops between a distant terminal and individual customer telephones, as well as to diagnostic systems for evaluating optical links between remote terminals and distant terminals.

BACKGROUND OF THE INVENTION

In typical telephone systems, phone calls are routed by a central office, through intermediate equipment, and ultimately connected to an individual customer's telephone. Central offices typically serve tens of thousands of telephone lines. Historically, relay circuitry at a central office has made connection of a call, in the form of an analog signal, directly to a pair of copper wires that lead to a called customer's premises. In modernized installations, an increasing portion of those connections are being multiplexed via a digitized link, often fiber optic cable, capable of carrying multiple phone calls through intermediate equipment at a first intermediate terminal. This arrangement removes congestion from the central office. Physical connection of the analog signal to the called customer's copper wire pair can either be made at the first intermediate terminal or at a further intermediate terminal closer to the customer's premises. The further intermediate terminal includes electronic equipment in curbside or in-building pedestals that serve only a few customers. Reducing the distance the analog signal must travel on copper wires to the customer's premises helps preserve signal quality.

The components in such systems are known by various names, but for this discussion the first intermediate terminal is denoted "remote terminal," and the equipment in the pedestal serving a relatively small number of customers is denoted "distant terminal." The copper wires to a customer's premises are referred to as a "loop" or a "line," and the portion of a loop that leads from the street to the house will be called a "drop." Of course, homes and businesses physically close to a central office, need not be coupled through a remote terminal. However, neighborhoods are commonly serviced through remote terminals, each serving about 500 telephone lines. New subdivisions or apartment houses may be served through distant terminals, also called "optical network units," that inwardly communicate to the central office through remote terminals and outwardly serve only a few telephones found in several nearby residences.

Testing of phone lines or drops is an important, conventional function typically provided by automated equipment that sequentially attaches to each phone loop served by a single central office and performs a series of electrical tests on each loop. Central offices with remote terminals present the challenge of performing the electrical tests from the central office on loops that are not attached to the central office. They are attached, often miles away, at the remote terminal. Attachment for testing to a loop not connected to the central office is most commonly accomplished through a single pair of copper wires, called a "bypass pair," that are installed alongside the optical fiber leading to the remote terminal. Thus one pair of copper wires, plus a few spares, provide the means for testing about 500 phone loops extending from a single remote terminal. The same challenge arises in the case of distant terminals, except that the use of one pair of test wires plus a few spares dedicated to testing only the dozen or so phone loops or drops attached at the distant terminal is not efficient. Moreover, the need for installing copper wires defeats one of the purposes of installing a distant terminal that is intended to derive its functionality through optical fibers alone.

The established procedure for testing copper drops at distant terminals has been specified in the Bellcore standard TR-909. That procedure calls for a drop testing device to be installed at each distant terminal. On command, usually nightly, from the automated equipment at the central office, the drop testing device performs a series of tests, analyzes the results, and reports a pass-fail summary of its findings in digitized form via the optical fiber to the remote terminal. The remote terminal, in turn, uses special equipment to receive those digital results and convert them to a selection of resistive values that can be read by the automated equipment at the central office via the bypass pair of wires. The automated equipment at the central office can be programmed to recognize those particular resistive combinations, not as the real resistive condition of a loop, but rather as a special code in which the specific resistive values are indicative of the pass-fail summary.

The specified tests include hazardous voltage (i.e., ac voltage above 135 V or dc voltage above 50 V), foreign voltage (i.e., ac voltage above 10 V or dc voltage above 6 V), resistive faults (i.e., resistance less than 150,000 ohms), receiver off-hook (i.e., a greater than 15% nonlinearity between resistances measured at two different voltages), ringer (i.e., out-of-range ac resistance values, either too high or too low), and sometimes other tests. These tests are measured in various specified combinations across the tip, ring, and the ground terminals, where tip and ring are the names of the two wires in the loop or drop leading to a telephone. Additionally, if multiple tests fail, only one failure is reported based on a predetermined priority. Signals are not provided that can be analyzed to derive specific values for test results.

The described test equipment is inefficient in the sense that each unit serves to test only a few phone drops at a single distant terminal and is used at a particularly low duty cycle, e.g., a few seconds each night. Additionally, the test circuit is complex, e.g., it includes functions of connecting, scaling, rectifying, filtering, measuring, calibrating, analyzing, prioritizing, and reporting. It only generates a single pass-fail report with no proportional data that might be useful for identifying a degrading system or a system with multiple failures. Moreover, the system defined in TR-909 only tests the phone drops themselves, and does not provide for evaluation of optical communication components and the fiber optic cables between the remote terminal and the distant terminal. The system interrogates at a particular time, and then a test is performed. A test in a nominal system may take 35 seconds to perform per line but only one half second to transmit. When tests are made only at the time a customer telephone is interrogated, there is a chance of encountering a busy condition. If test results can be obtained at any time during the day and transmitted upon receipt of an interrogation signal, the busy condition can be avoided. In summary, the distant terminal test circuits are expensive per line tested and do not provide the comprehensive testing that could be more useful for service improvement and reliability.

SUMMARY OF THE INVENTION

It is therefore a general object of the present invention to provide a simplified drop test system particularly suited for communicating over fiber optic cable that can selectively deliver either the conventional pass-fail results or detailed drop test data useful to telephone craftsmen.

It is also an object to provide a measurement system of the type described that also includes measurement of parameters indicative of optical component performance, which components comprise optical transmitters, receivers and optical fibers.

It is a more specific object of the present invention to provide a measurement system of the type described that minimizes the functions performed at the distant terminal and makes use of preexisting conventional circuitry otherwise found in a distant terminal, thereby further minimizing the cost of testing equipment.

It is another more specific object of the present invention to provide a system of the type described which performs tests prior to interrogation by the central office, thereby speeding central, daily collection of test data, and in which results can be reported, stored, or tabulated in selected formats.

It is a further more specific object of the present invention to provide a system of the type described which is capable of diagnostics for identifying lines and reporting lines with intermittent behavior.

Briefly stated, in accordance with the present invention, there is provided a testing system performing diagnostic measurement as well as drop testing in a telecommunications system serving customer telephone lines connected to a central office through distant terminals. A testing circuit, or "test head," at a distant terminal functions in combination with circuitry at a remote terminal to perform conventional drop test measurements. The remote terminal and distant terminal are linked by a digital link such as an optical fiber. Additionally, circuitry is installed at both the distant terminal and the remote terminal for measuring parameters indicative of operating characteristics of optical components transmitting, receiving and carrying optical signals. These components may include laser diode or light emitting diode transmitters, photocell receivers and the optical fiber. These data are independently measured at each end of the fiber cable. Primitive data collected at the distant terminal are transmitted without interpretation to the remote terminal over the optical fiber. The testing system may further comprise comparison, storage and reporting means to develop a performance profile for components in order to identify deteriorating components.

BRIEF DESCRIPTION OF THE DRAWINGS

The means by which the foregoing objects and features of invention are achieved are pointed out with particularity in the claims forming the concluding portion of the specification. The invention, both as to its organization and manner of operation may be further understood by reference to the following description taken in connection with the following drawings.

Of the drawings.

DESCRIPTION OF THE PREFERRED EMBODIMENTS

Figure 1:
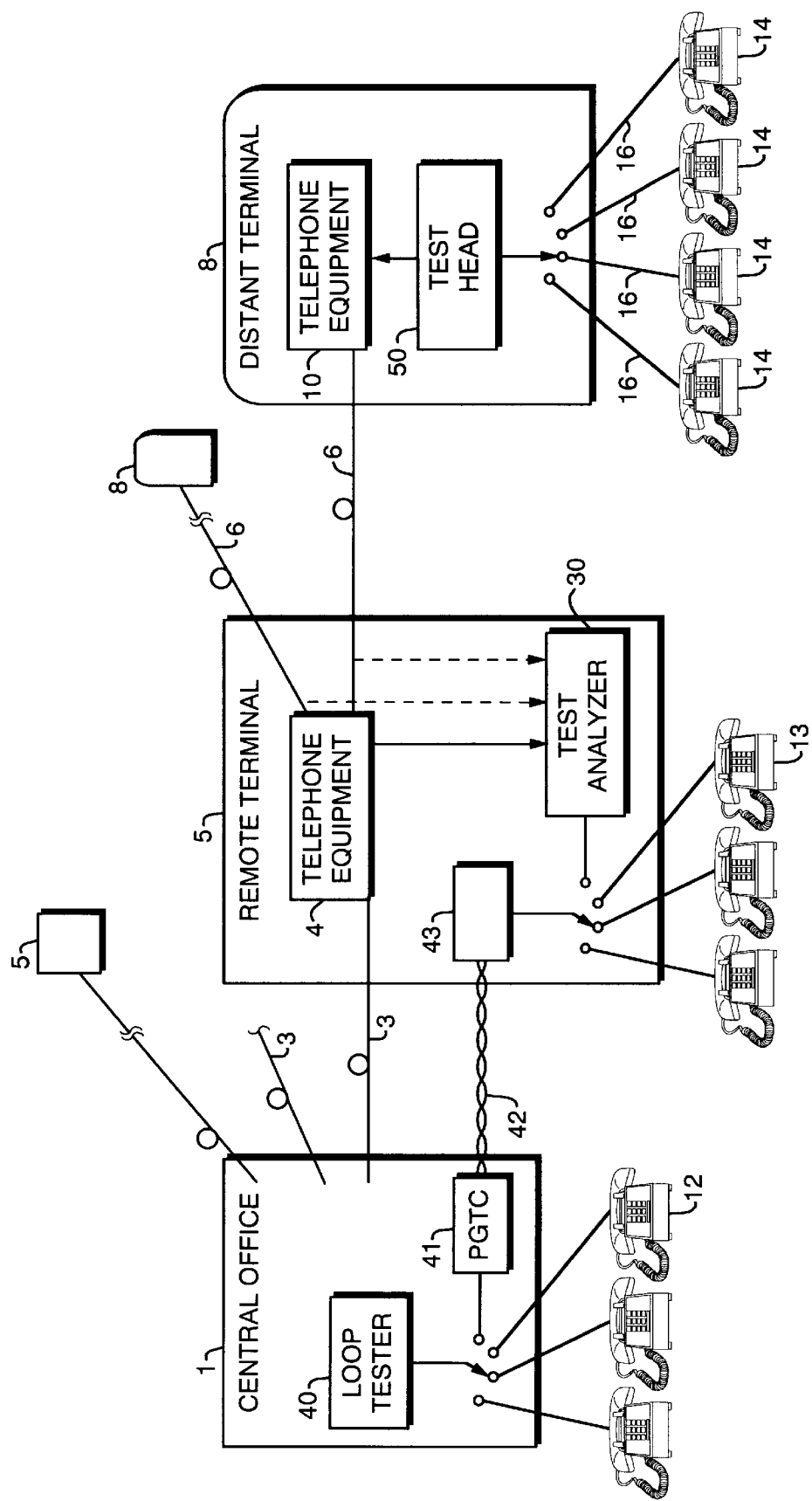
FIG. 1 is a block diagrammatic representation of the testing system according to the present invention used in conjunction with a conventional telephone exchange system.

Referring now to FIG. 1, there is illustrated in block diagrammatic form a measurement system constructed in accordance with the present invention in the context of a well-known telephone exchange. A central office 1 serves many customers, both nearby telephones 12, remote telephones 13, and distant telephones 14. The term customer telephone refers to any instrument that is customarily connectable to a phone jack. Digital links 3 connect the central office 1 to each of a number of remote terminals 5. Remote terminals 5 may serve a plurality of distant terminals 8. Remote terminal telephone equipment circuit 4 comprises interfacing and multiplexing means. Telephones 13 may also be connected directly to the remote terminal 5. Each distant terminal 8 is connected to a remote terminal 5 via a digital link comprising optical fiber cable 6. The digital link 3 is preferably an optical fiber, but may be a twisted pair of copper.

The distant terminal 8 includes telephone equipment circuit 10. The circuit 10 includes prior art circuitry needed to operate telephones, such as optoelectronic circuitry for converting signals between electrical and optical form at the interface with the optical cable 6, multiplexers for combining multiple telephone signals to and from a single digital signal over a digital link comprising the optical cable 6, a ringing circuit, telephone line circuits, and other functions well-known in the art necessary to monitor and operate telephone equipment. The distant terminal 8 serves a small number of individual customer telephones 14, a "small number" being typically 12 to 48 customer telephones. Each customer instrument 14 is connected to the distant terminal 8 by a copper line referred to as a drop 16. Each drop 16 is connected to the distant terminal at respective tip and ring terminals 17 and 18 shown in FIG. 2. Further components of the distant terminal 8 are illustrated in FIG. 2.

A test head 50 constructed in accordance with the present invention is installed at the distant terminal 8 in a manner further described below with respect to FIG. 2. The test head 50 is used in place of a conventional drop testing device. The test head 50 will perform traditional prior art drop tests and may include additional capability useful for evaluating the quality of the optical link, the optical fiber 6, and its interface components. The test head 50 communicates via the shared optical fiber cable 6 to a test analyzer 30 installed in the remote terminal 5. A loop tester 40 at the central office 1 is connected via a pair gain test controller 41 through a wire loop bypass pair 42 to drop testing equipment 43 in the remote terminal 5.

Figure 2:
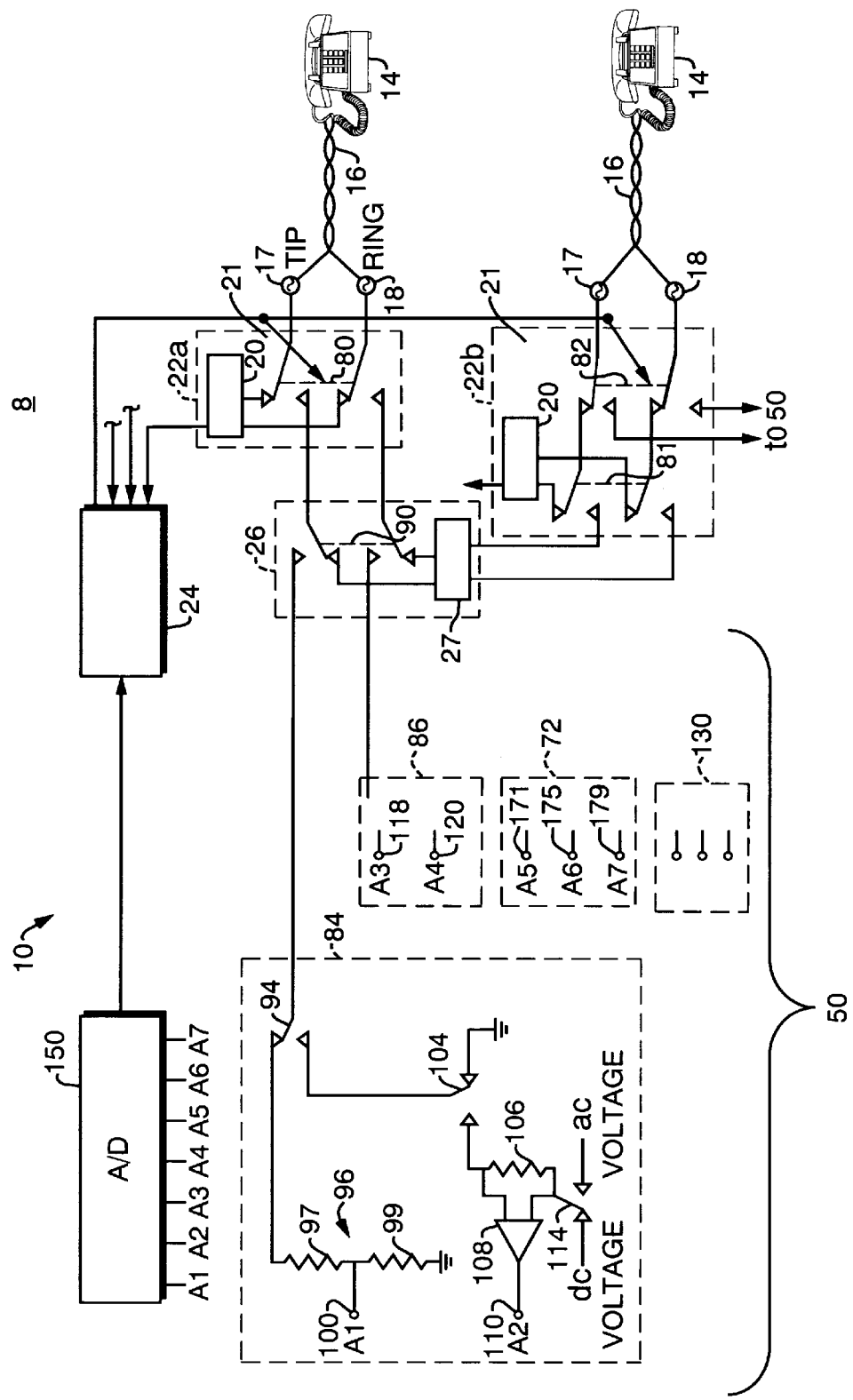
FIG. 2 is an illustration partly in schematic and partly in block diagrammatic form of a test head and other immediately adjacent components, all of which are included in a distant terminal.

FIG. 2 illustrates further components of the distant terminal 8. A conventional line card 21 is provided for each drop 16. The line card 21 may take either of forms 22a or 22b further described below. The line card 21 responds to a command signal from microprocessor 24 to connect its associated customer instrument 14 to test head 50 in a test mode or to conventional line circuitry 20 in a normal operating mode. A single ringing generator 26, also of prior art construction, connects to respective line cards 21 when needed to ring telephones. Microprocessors 24 perform the conventional functions of managing the distant terminal as well as multiplexing the several digitized phone signals from line cards 21 and other control signals into a single stream of digital bits for transmission over the optical fiber cable 6. According to the present invention, the microprocessor 24 may need to be modified in its functionality or augmented with an additional microprocessor for controlling the testing sequence and to multiplex the primitive data gathered by the test head 50.

The test head 50 includes drop test circuitry 84 and 86 and optical component sensing circuitry 72, and may include sensor responsive circuitry 130. The optical component sensing circuitry 72 is further described with respect to FIG. 3. Drop test circuits 84 and 86 are of like construction, one being provided respectively for the tip and ring terminals 17 and 18 of a phone drop 16 currently connected for testing.

A double pole double throw test relay 82 found on each line card 22b may be used to selectively transfer the tip and ring drop connections entering at terminals 17 and 18 from a first position to a second position. It should be noted that although relays are described and diagrammed herein as electromechanical relays, their switching functions may equally well be accomplished in some cases with solid state devices.

In the first, normal, position of test relay 82, the drop is coupled to its associated line circuitry 20 through ringer relay 81. In the second position of test relay 82, the drop is coupled to the common test head 50. The tip-testing circuit 84 within the test head 50 is illustrated in schematic form. Switching of the relay 82 is a conventional drop test function and is controlled by the microprocessor 24 in a conventional manner. This configuration of having a test relay 82 on each line card is the customary configuration for effecting drop tests. A preferred, but not necessary, feature of this invention, and one which further reduces cost by minimizing components, is shown on line card 22a as a tandem combination of ringer relay 80 and test relay 90. In this configuration, only one test relay 90 is needed at each distant terminal 8 to serve all line cards 22a that may be installed at a given site.

In accordance with the latter embodiment of the present invention, test relay 90 in the ringing generator 26 has its input terminals connected to the ringing position of the ringer relay 80. In a first position, test relay 90 connects the ringing terminal of the ringer relay 80 to the ringing generator circuit 27. In a second position, test relay 90 connects the ringing terminal of ringer relay 80 to the test circuits 84 and 86.

Where line card 22b is utilized, a ringer relay 81 and a test relay 82 are provided. These two relays 81 and 82 are never energized simultaneously, and when deenergized cause the phone drop to be connected to the line circuitry 20 for normal phone usage. For the example of a 24-line distant terminal, there would be 24 line cards 22b with a total of 48 double pole double throw relays 81 and 82.

In the preferred form, the line card 22a is utilized to embody a line card 21. The line card 22a has a single relay, ringer relay 80. In addition the ringing generator 26 is outfitted with a single relay, a test relay 90. When both relays are deenergized the phone drop 16 is connected to the line circuitry 20 for normal phone usage. When the ringer relay 80 only is energized, ringing is effected for the attached drop and its associated telephone instrument 14 by connection to the ringing circuit 27. When both the ringer relay 80 and the test relay 90 are energized, testing of the drop is effected by connection to the test head 50. For the example of a 24-line distant terminal, there would be one ringing generator with 1 relay and 24 line cards with 24 relays for a total of 25 double pole double throw relays. Therefore in an embodiment using line card 22a, a 48% reduction in the number of relays is achieved compared to embodiments utilizing line card 22b.

As previously described, the tip and ring test circuits 84 and 86 are identical. The schematic illustration of the circuit 84 for the tip terminal also serves to illustrate the structure of the ring test circuit 86. When a drop test is to be performed, the incoming tip wire from terminal 17 is connected to the input terminal of a relay 94. In a first position, the relay 94 provides a connection to a voltage divider 96 providing an output to a terminal 100. The output terminal 100 is connected to a channel A1 of a multiplexed analog to digital converter 150. The analog to digital converter 150 thus provides a numerical equivalent of the voltage found on the tip wire appearing at the terminal 17. The test head 50 does not process this measurement, rather the primitive digital result is combined with telephone signals by the microprocessor 24 and delivered to the remote terminal 5 via the optical fiber 6. The test analyzer 30 at the remote terminal 5 processes this primitive data to determine if the voltage is dc or ac and what its level is. This single measurement by the tip test circuit 84 is thus capable of providing data for indicating the first four parameters (hazardous ac, hazardous dc, foreign ac, or foreign dc) of the TR-909 procedure described above.

In the second position, the relay 94 connects the incoming tip wire from the terminal 17 to relay 104. In a first position, the relay 104 provides a connection to ground. In a second position, the relay 104 provides a connection to a voltage source with selective voltages of known values as diagrammed by relay 114. The voltage sources are needed when making resistance measurements of the line being tested, and the resistance is calculated after measuring the resulting current through the line. The current is measured with a low-value series resistor 106 that is sensed by the differential amplifier 108. The differential amplifier's output terminal 110 is connected to channel A2 of the same multiplexed analog to digital converter described earlier. The simultaneous combinations of positions of the relay 104 in test head 84 and the corresponding relay found in test head 86 provide the necessary interconnections to answer the remaining parameters (resistive faults, receiver off-hook, and ringer) of the TR-909 procedure described previously.

Similarly to the above-described tip test circuit 84, the ring test circuit 86, has terminals 118 and 120 with analog outputs that are connected to channels A3 and A4 of the multiplexed analog to digital converter 150.

Phone drops are typically exposed to the elements and exhibit characteristics proportional to temperature and dampness, thus these conditions could be useful for "correcting" instantaneously measured characteristics. Shock measurements, for example, could be indicative of vandalism or roadside accidents, either of which could affect the functionality or reliability of possibly injured components. Thus sensory inputs such as temperature, humidity, and shock that may be of value when analyzing electrical characteristics of outdoor equipment are provided from a sensor module 130.

Figure 3:
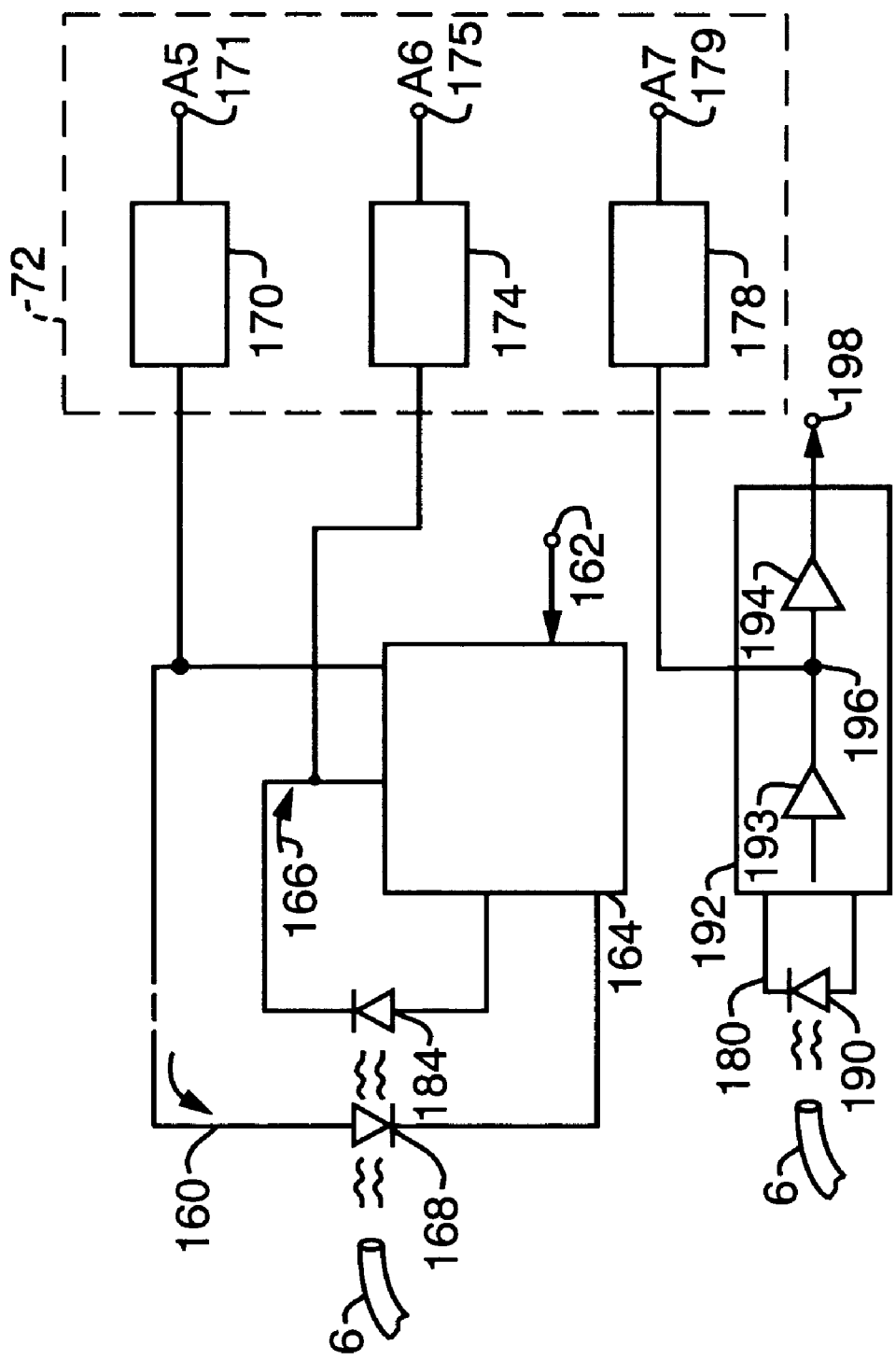
FIG. 3 illustrates test circuitry of the present invention for measuring performance of optical components at both the distant terminal and the remote terminal.

FIG. 3 illustrates the optical monitoring module 72 of FIG. 2 and its coupling to optical fibers 6. Similar optical monitoring modules 72 and 220 (FIG. 4) are installed respectively at both the distant terminal 8 and the remote terminal 5. The interconnection of module 220 to its corresponding end of an optical fiber 6 may be accomplished in an identical manner to that for the module 72, and is therefore illustrated in FIG. 3. The modules 72 and 220 each monitor optoelectronic characteristics of both the transmitter and receiver of the optical fiber link. Transmitters used in fiber optic systems commonly comprise laser diodes or light emitting diodes (LEDs) either of which may have its light output monitored. A laser diode is monitored through its rear facet by a photodetector. Laser diodes are commonly manufactured to include a photodetector for monitoring rear facet light output to provide feedback to a driver circuit for the laser diode. The light emitting diode is usually driven without feedback, but in some cases their light output may also be monitored. The embodiment of FIG. 3 utilizes a laser diode transmitter 160 incorporating a laser diode 168.

The electrical signals driving the laser diode 168 are digital, i.e., the signal is either full strength or off, resulting in pulses of light of equal intensity interspersed with darkness. A digital signal derived from the telephone equipment 10 is connected to the transmitter 160 at a terminal 162 to a laser driver circuit 164 providing an output to the laser diode 168 positioned to transmit light to the optical cable 6. Feedback 166 to the laser driver circuit 164 is derived from a rear facet monitor photodetector 184.

The optical monitoring module 72, and by similarity 220, includes a peak detection circuit 170 that measures the peak signal, and therefore the on-level signal, from the laser driver circuit. The peak detection circuit has an output terminal 171 which is connected to channel A5 of the analog to digital converter 150. This signal is indicative of the laser drive current when the laser is in its on-state.

The optical monitoring module 72 also includes a second peak detection circuit 174 that measures the peak signal, and therefore the on-level signal in the feedback signal 166 from the laser's rear facet monitor 184. The peak detection circuit has an output terminal 175 which is connected to channel A6 of the analog to digital converter 150. This signal is indicative of the light output of the laser diode when it is fully on.

Optical receiver 180 at the output end of the fiber link 6 consists of a photodetector 190 coupled to an amplification circuit 192. The amplification circuit 192 may have multiple stages, illustrated as 193 and 194, to assure a uniform peak output signal at terminal 198 leading to the telephone equipment 10 regardless of the intensity of the incoming light, and hence the level of the incoming receiver signal. At some stage in the amplifier cascade 193 to 194 the signal should be strong but still proportional to the incoming light level sensed by the photodetector 190. This proportional signal is provided at a terminal 196.

The optical monitoring module 72 must also include a third peak detection circuit 178 that measures the peak signal, and therefore the on-level signal at the point of proportionality 196. This peak detection circuit has an output terminal 179 which is connected to channel A7 of the analog to digital converter 150. This signal is indicative of the on-state light level received from the optical fiber 6.

Figure 4:
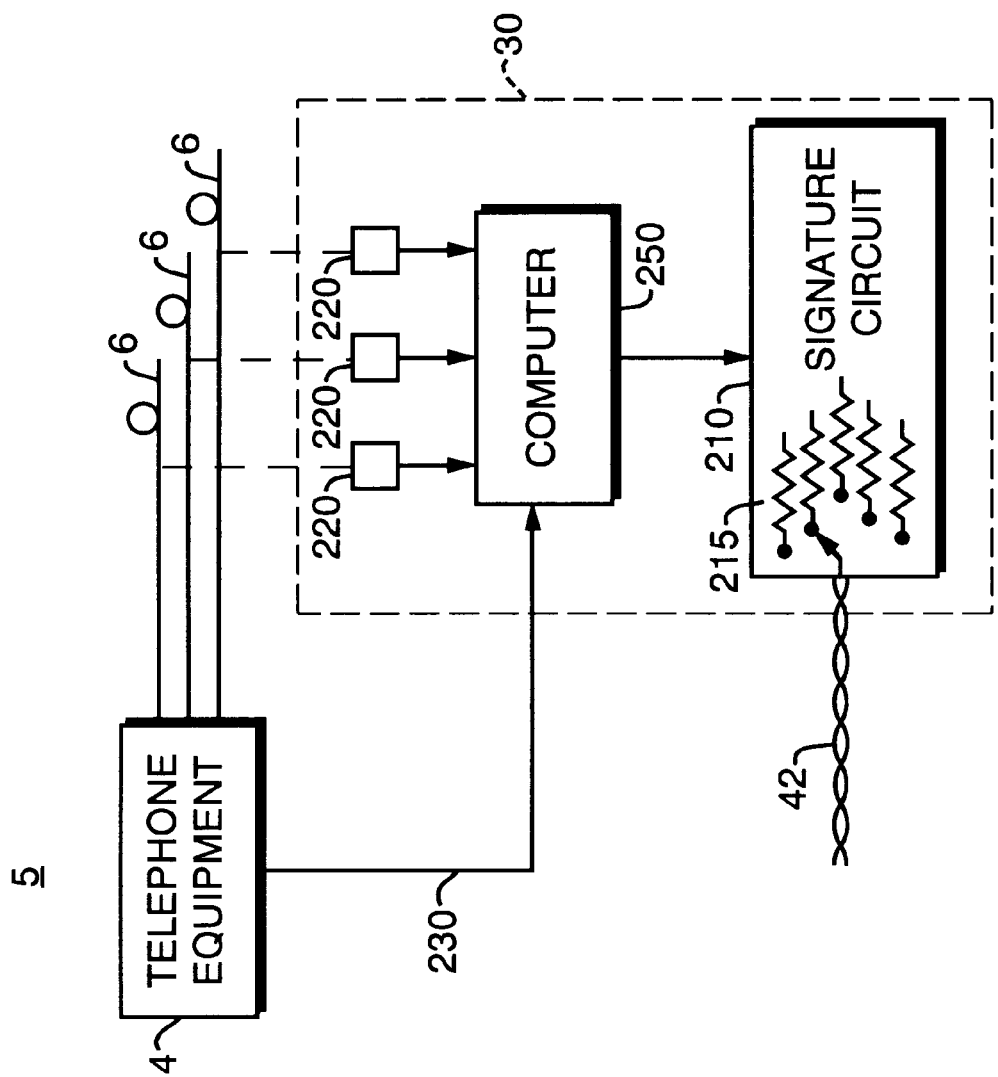
FIG. 4 is a block diagram illustrating test analysis circuitry at the remote terminal and reporting circuitry for interaction with the standard central office test circuitry.

FIG. 4 is a block diagrammatic representation of further details of the test analyzer 30 at the remote terminal 5. The test analyzer 30 comprises optical monitoring modules 220, each of which serves one of the incoming optical fibers, which may also be referred to as optical lines, 6, a computer 250 capable of interpreting and analyzing the incoming bit stream of digital data 230, and a signature circuit 210 that can set resistive signatures 215 in accordance with Bellcore specification TR-909 to be read by the loop tester 40 via the bypass pair 42.

Each of the optical monitoring modules 220 is constructed in the same manner and has the same functionally as the optical monitoring module 72 found at each distant terminal 8. Each module 220 includes three output signals equivalent to A5, A6, and A7 from module 72. The computer 250 is capable of receiving and processing the digitized stream of incoming test data from the several distant terminals 8 served by the remote terminal 5 and from the several optical monitoring modules 220 installed at the remote terminal. The computer 250 includes means for calibrating and interpreting the data, processing it into logical statements of condition found on each of the many drops 16 served by the several distant terminals 8 and of the condition of the several optical links 6 communicating with each of the several distant terminals 8.

The comparisons of optical parameters from corresponding modules 72 and 220 at opposite ends of each fiber optic link can be used to logically develop statements of condition for each fiber link. For example, the ratio of output from the rear facet monitor of a laser diode 168 (FIG. 3) to the laser's drive current would be a measure of the laser diode's condition. The ratio of that same rear facet output to the photodetector 184's signal as measured at the opposite end of the fiber 6 is a measure of condition of the optical fiber 6 and its connectors and splices. If both transmit and receive paths detected the same degree of degradation, it would suggest that the problem is in the fiber cable, not the connectors or splices. Other similar logical patterns would point to other locations of degrading performance or impending failure.

In the preferred practice, a drop test for a single line may be repeated, for example, every 1 to 2 hours on a generally regular basis. Departure from the regular cycle will occur whenever the drop 16 and its associated line to be tested is discovered to be in use or whenever the distant terminal 8 serving the particular customer telephone being called is too busy with other functions such as ringing phones. Under these conditions the cycle proceeds to the next line in the test sequence. At the end of a 24-hour period all lines will have been tested at least several times, except in the rare event of a line found to be in use on every test occasion. This rate of testing would allocate about 10 seconds of test time for each line.

Each test is initiated by the test analyzer 30 (FIG. 1), but the detailed testing sequence is controlled by the local microprocessor 24 (FIG. 2). When the testing begins, the test relay 90 is energized then the ringer relay 80 is energized. This sequential process connects the tip 17 and ring 18 terminals of the drop to be tested to the test circuits 84 and 86 in test head 50. Clearly if the ringing generator 26 is active ringing any of the multiple lines served from that particular distant terminal 8, the testing cannot proceed. This however should not be a detriment to this test system since a) the expected use rate of a ringing generator at a site serving so few drops is very low, b) the tests are repeated enough times each day that skipped tests should not significantly impact the accumulation of test data, c) it is possible to perform drop tests in multiple sessions during the 2-second silent period between ringing bursts, and d) there is the option of testing through a conventionally installed test relay 82 as first described above and shown on line card 22b illustrated in FIG. 2.

For the first test, described only for the tip terminal 17 being connected to its test circuit 84, the connection from the tip terminal is through the deenergized relay 94 to the scaling resistors 97 and 99. These resistors are selected to reduce the voltage to 1.25% so that the instantaneous peak voltage found in an ac signal of 135 V is reduced to less than 2.5 V at terminal 100. As previously described, the signal A1 from terminal 100 is multiplexed into an analog to digital converter. If, for example, the converter is a 12-bit converter configured for binary inputs, the converted measurements expressed herewith in digital numerals rather than in 12-bit binary numerals would have a value of 3430 at the instant of reading 135 V, a value of 2048 at the instant of reading 0 V, and a value of 666 at the instant of reading −135 V. This resolution would result in the ability to read voltages as small as 0.098, which would be converted to the value 2049, one integer larger than the 2048 corresponding to 0.000 volts.

For the subsequent tests, relay 94 would be energized. The required dc resistance and ac impedance measurements would proceed by sequentially connecting to ground, ac voltage, or dc voltage while measuring the resultant current flow through the precision resistor 106 with the differential amplifier 108.

Without interpretation at the test head 50, these binary values are delivered to the microprocessor 24 to be incorporated into the digital stream of data being sent to the remote terminal 5. Several options for accommodating these test data may be applied. They could be multiplexed into a "borrowed" phone channel, at least one of which should be available since the channel being tested is not in use. They could also be incorporated into the "overhead" or "control" channel typically found in such digital implementations. For example, the extended superframe format designed for transmission of 24 data channels at 1,544,000 bits per second includes one extra bit for framing and signaling for each voice sampling cycle, which is repeated 8,000 times per second. A fourth of those are used for frame registration, leaving 6,000 bits available for other purposes. If only 2,000 of those bits were allocated to the testing function, then about 166 samples of 12-bit data could be transmitted every second. That rate of sampling is sufficient to resolve a 60 Hz sine wave adequately to recognize it as such.

Once these data are received at the remote terminal 5, they are separated and directed to its test analyzer 30 to be processed. Processing consists of using software to reconstruct the voltage waveform and interpret it for its elements, i.e., ac voltage level, dc voltage level, superposition of ac and dc, and frequency of the ac signal. This is far more information than is needed to calculate all the measurement thresholds required by the TR-909 test specification. Moreover, since these data are being received every hour or so for a given drop 16, they can be compared hour to hour and averaged to develop a historical characteristic profile that should be highly useful to service craft in the event that the drop malfunctions. Also, the test analyzer 30 could be programmed by having selected data stored therein so that comparison to test data may be used to proactively recognize categories of problems such as erratic lines, intermittent conditions, or out of tolerance measurements.

Additionally, the typical results or the most recent results can be queued up ready for the nightly survey by the central office loop tester 40, thereby saving testing time when that survey occurs. As described previously, the loop tester 40 is expecting a "signature" in the form of a predetermined set of resistive values that are codes for the various pass or fail results of the TR-909 tests. The signature circuit 210 presents this resistive pattern 215 to the bypass pair 42 that is connected back to the loop tester 40. As an example, if an extreme resistive condition has been measured by test head 50 on one of the lines connected through a drop 16 attached at distant terminal 8 and interpreted as an out-of-range fault by the test analyzer 30 at remote terminal 5, the fault would be labeled a "resistive fault." Bellcore TR-909 specifies that the signature for a resistive fault is a combination of resistors with the values 58,000 ohms across tip-to-ring, 90,900 ohms tip-to-ground, and 90,900 ohms ring-to-ground. Similarly the signature indicative of a "receiver off-hook" is the same except that the tip-to-ring resistance is 68,000 ohms. Other combinations are defined for all possible faults.

In an alternate embodiment of the invention, the test analyzer 30 may be relocated to the central office 1. This arrangement would require forwarding of the digital streams of test data from the several remote terminals to the central office, but it would result in analyzing equipment that served thousands of lines instead of merely serving hundreds of lines.

The present invention is a highly cost effective embodiment in which circuitry that serves a few lines is of a minimal nature, with minimal functionality. Furthermore, the very nature of its functionality permits the sharing of switching relays with the result that the savings gained from eliminating electronic hardware ordinarily deployed on each line card may entirely offset the cost of the test components deployed for testing the few lines at a single site. Therefore, the cost of providing a test capability at the distant terminal is little or nothing. The only significant equipment costs apply to equipment that is installed at the remote terminal or central office where the cost is apportioned over many hundreds or thousands of lines being tested. And finally, the functionality provides the effect of increased testing speed and added usefulness of the data collected.

The above teachings will enable those skilled in the art to construct many different forms of the invention.

The following is claimed:

1. A telephone system diagnostic measurement system in a telephone system, the telephone system comprising a number of distant terminals each connected to a remote terminal and in which a number of remote terminals are each connected to a central office having test survey equipment, each distant terminal having a telephone equipment circuit for receiving signals sent to and for transmitting signals from the distant terminal, the distant terminal further comprising a drop test measurement circuit for performing drop test measurements on customer telephone lines, said diagnostic measurement system comprising: a test head circuit for connection to the telephone equipment circuit, said test head circuit including said drop test measurement circuit for producing primitive data collected at the distant terminal that are indicative of parameters of selected components of the telephone system, means for transmitting said primitive data to the remote terminal, and a test analyzer in said remote terminal coupled to receive said primitive test data and capable of analyzing said primitive data and to produce signals indicative of conditions found on the customer telephone lines.

2. The diagnostic measurement system according to claim 1 wherein said test analyzer circuit is selectively configured in respective first and second modes to produce conventional pass-fail drop test indicators and outputs indicative of numerical values of said data indicative of selected parameters.

3. The diagnostic measurement system according to claim 2 wherein each distant terminal is connected to the remote terminal by an optical link, the telephone equipment circuits in distant terminals each comprise an optical transmitter transmitting light to the optical link and an optical receiver receiving light from the optical link, and wherein said test head circuit comprises means for measuring output of said optical transmitter and means for measuring the output of said optical receiver, and means for transmitting data indicative of measured outputs of said optical transmitter and said optical receiver to said test analyzer.

4. The diagnostic measurement system according to claim 3 wherein the remote terminal comprises a telephone equipment circuit including an optical transmitter transmitting light to the optical link and an optical receiver receiving light from the optical link, and wherein said telephone equipment circuit comprises means for measuring the output of said optical transmitter and means for measuring the output of said optical receiver, and means for transferring data indicative of the measured outputs of said optical transmitter and said optical receiver to said test analyzer, and means for comparing a signal indicative of the intensity of output of said optical transmitter transmitted at one end of the optical link to a signal indicative of receiver output in response to light received from said transmitter at an opposite end of the optical link.

5. The diagnostic measurement system according to claim 4 wherein said test head circuit further comprises means for providing outputs indicative of condition responsive sensors in said distant terminal and means for transmitting said outputs to said analyzer.

6. The diagnostic measurement system according to claim 5 wherein said telephone equipment circuits in the distant terminals comprises a first relay for connecting terminals on the relay selectively to a telephone ringing circuit or to said test head circuit, and a plurality of second relays, each second relay associated with one customer telephone, each second relay connecting a customer telephone to the telephone equipment circuit or to the first relay.

7. A telephone system diagnostic measurement system according to claim 2 wherein said remote terminal comprises processor means for interrogating said test head circuit in said distant terminal and means for storing signals prior to reporting said signals to the test survey equipment at the central office.

8. A telephone system diagnostic measurement system according to claim 6 wherein said remote terminal comprises processor means for interrogating said test head circuit in said distant terminal and means for storing signals prior to reporting said signals to the test survey equipment at the central office.

9. A telephone system diagnostic measurement system according to claim 7 wherein each distant terminal is connected to the remote terminal by an optical link, the telephone equipment circuits in distant terminals each comprise an optical transmitter transmitting light to the optical link and an optical receiver receiving light from the optical link, and wherein said test head circuit comprises means for measuring output of said optical transmitter and means for measuring the output of said optical receiver, and means for transmitting data indicative of measured outputs of said optical transmitter and said optical receiver to said test analyzer.

10. A telephone system diagnostic measurement system according to claim 8 wherein said test analyzer is enabled to collect successive sets of data and produce reports thereof wherein said processor means is configured to repeatedly interrogate said test head circuit in said distant terminal and to collect data transmitted from the distant terminal.

11. A telephone system diagnostic measurement system according to claim 9 wherein said test analyzer is enabled to collect successive sets of data and produce reports thereof wherein said processor means is configured to repeatedly interrogate said test head circuit in said distant terminal and to collect data transmitted from the distant terminal.

12. In a telephone system having a diagnostic measurement system and which telephone system includes (a) a central office;
(b) a plurality of distant terminals;
(c) a plurality of remote terminals, each distant terminal connected to one of said plurality of remote terminals, said remote terminals each connected to said central office having test survey equipment, each distant terminal having a telephone equipment circuit for receiving signals sent to and for transmitting signals from the distant terminal, the improvement comprising:

each distant terminal having a drop test measurement circuit for performing drop test measurements on customer telephone lines;

the diagnostic measurement system comprising:

a test head circuit in each distant terminal for connection to the telephone equipment circuit, said test head circuit including said drop test measurement circuit for producing primitive data collected at the distant terminal that are indicative of parameters of selected components of the telephone system, means for transmitting said primitive data to the remote terminal, and a test analyzer in each remote terminal coupled to receive said primitive test data and capable of analyzing said primitive data and to produce signals indicative of conditions found on the customer telephone lines.

\* \* \* \* \*